US008746058B2

(12) United States Patent
Martínez Valdegrama et al.

(10) Patent No.: US 8,746,058 B2
(45) Date of Patent: Jun. 10, 2014

(54) LIQUID FUEL TANK FOR MEASURING FUEL VOLUME

(75) Inventors: Vicente Martínez Valdegrama, Alpedrete (ES); Luis Manuel Rodríguez Urbina, Leganés (ES)

(73) Assignee: Airbus Operations, S.L., Getafe (ES)

( * ) Notice: Subject to any disclaimer, the term of this patent is extended or adjusted under 35 U.S.C. 154(b) by 129 days.

(21) Appl. No.: 13/315,890

(22) Filed: Dec. 9, 2011

(65) Prior Publication Data

US 2012/0138779 A1 Jun. 7, 2012

Related U.S. Application Data

(63) Continuation of application No. PCT/ES2010/070278, filed on Apr. 30, 2010.

(30) Foreign Application Priority Data

Jun. 9, 2009 (ES) .................................. 200930286

(51) Int. Cl.
*G01F 23/00* (2006.01)

(52) U.S. Cl.
USPC .............................. 73/293; 250/577; 385/115

(58) Field of Classification Search
USPC ......... 73/293, 36, 335.01; 250/573–575, 577, 250/900; 340/619; 356/133, 399, 400, 436; 385/4, 9, 28, 47, 115, 116
See application file for complete search history.

(56) References Cited

U.S. PATENT DOCUMENTS

| | | | |
|---|---|---|---|
| 3,272,174 A | 9/1966 | Pribonic | |
| 3,535,933 A * | 10/1970 | Pliml, Jr. | .......................... 73/327 |
| 4,630,476 A | 12/1986 | Moore | |
| 6,173,609 B1 * | 1/2001 | Modlin et al. | .................. 73/293 |
| 6,612,169 B1 * | 9/2003 | Martin | ............................ 73/293 |
| 6,805,070 B2 * | 10/2004 | Lee et al. | ...................... 116/109 |
| 2002/0124643 A1 * | 9/2002 | Robinson | ..................... 73/290 R |
| 2003/0019292 A1 * | 1/2003 | Robinson et al. | ................ 73/293 |
| 2005/0199833 A1 * | 9/2005 | Corven et al. | .................. 250/573 |

OTHER PUBLICATIONS

International Search Report mailed Aug. 13, 2010 in PCT/ES2010/070278 filed Apr. 30, 2010.

* cited by examiner

*Primary Examiner* — Hezron E Williams
*Assistant Examiner* — Hoang Nguyen
(74) *Attorney, Agent, or Firm* — Oblon, Spivak, McClelland, Maier & Neustadt, L.L.P.

(57) ABSTRACT

Its object is to allow measurement of the volume of fuel (2) using optic fiber cables (3); it is characterized in that, adhered to one or more of the inner faces of the tank (1) there is at least one sheet (4) in which a plurality of optic fiber cables (3) with different lengths are included, located between the inner face of the tank and the sheet (4). One set of the ends (10) of the optic fiber cables (3) are disposed so that they are in contact with the fuel (2) when it reaches their level, thereby allowing measurement of the fuel level at all times.
The preferred embodiment distributes the optic fiber cables (3) on two opposing lateral faces of the tank (1) so that they cross over one another and in opposite directions to measure any fuel level.
It is applied in aeronautics.

15 Claims, 6 Drawing Sheets

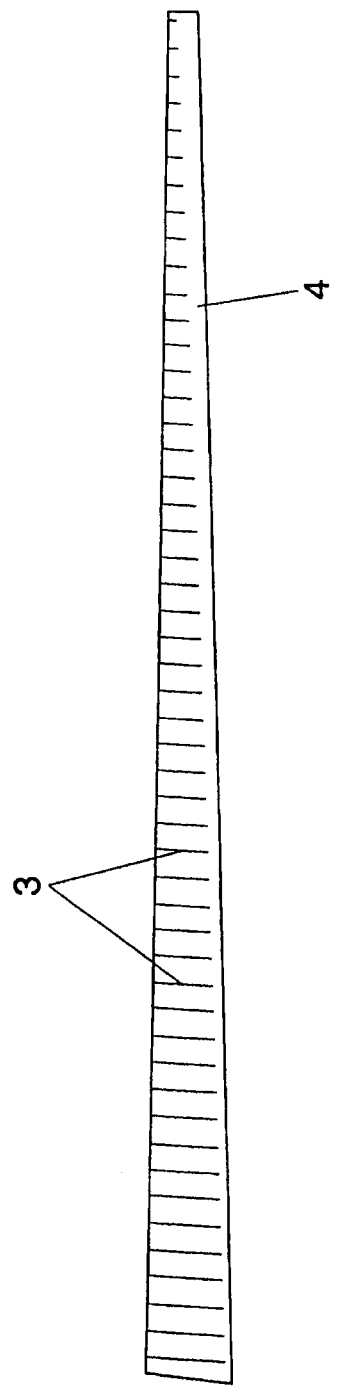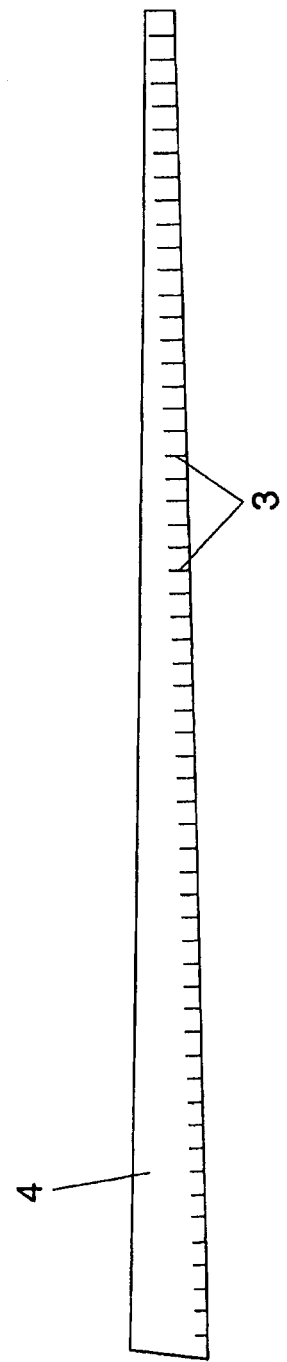
FIG. 4
FIG. 5

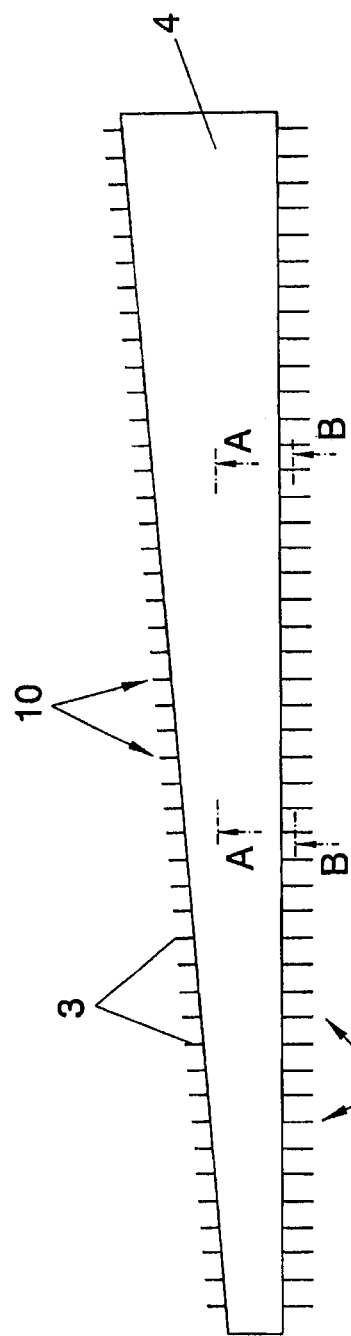
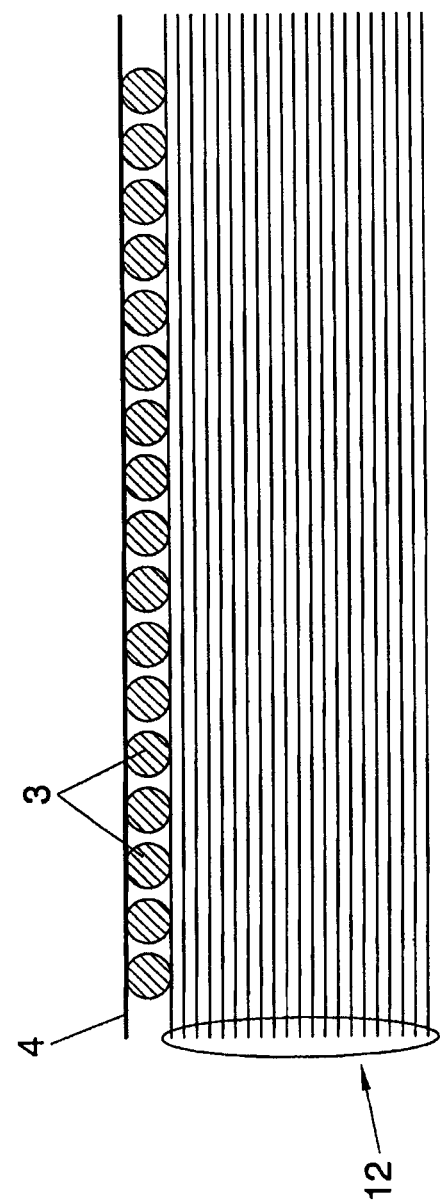
FIG. 6
A-A FIG. 7

LIQUID FUEL TANK FOR MEASURING FUEL VOLUME

OBJECT OF THE INVENTION

The invention relates to a liquid fuel tank which permits the volume of fuel it contains to be measured at any moment, and which has the aim of providing a tank in which the cables, which are conventionally included inside the tank for making the measurements, are embedded in the inner walls of the tank itself, providing a high degree of protection for those cables. Moreover, the invention eliminates the installation of instrumentation inside the tank during the assembly process along with the wiring required by it.

A further object of the invention is to carry out the measurement of fuel by means of some measuring equipment based on the refraction of light in different media, by means of the transmission/reception of light by means of optic fibre, in such a way that the cables embedded inside the actual structure of the fuel tank are made of optic fibre.

In addition, the invention provides an optimum distribution of cables in order to effect that measurement.

The invention is applicable in any sector of industry in which a tank containing liquid fuel is used, said tank is manufactured in CFRP (Composite Fibre Reinforced Plastic), and in which the measurement of its volume needs to be made at all times. More specifically, the invention is applicable in the aeronautical industry in which the fuel tanks are made of carbon fibre in which the optic fibre cables are arranged. More particularly, the invention is applied to the fuel tank of the horizontal stabilizer of an aircraft, in which the measurement of its volume of fuel is obtained by means of arranging the optic fibre on the carbon fibre making up the tank.

BACKGROUND OF THE INVENTION

The measurement of the quantity of liquid fuel for aircraft tanks is currently done by means of electrical equipment whose functioning principle is based on the induction of an electric current in a circuit with a variable permeability capacitor (the permeability of the dielectric of the capacitor is a function of the fuel level). The measuring equipment used in this type of arrangement is known as a gauge. Its design consists of two concentric cylinders each connected to an electric pole, between which an electric field is generated. According to the classical theory of capacitors, the capacitance of a capacitor is a function of the permeability of the dielectric existing between the surfaces of the two cylinders. This dielectric is in turn a function of the level of fuel which the tank has at any moment, in other words, when the gauge is not entirely submerged in the fuel the dielectric will consist of a percentage of air corresponding to the non-submerged part, and a percentage of fuel corresponding to the submerged part. In this way, a defined measurement of voltage will be obtained. The variation in the voltage (and the later treatment of each of the signals obtained from each equipment) in each of the gauges distributed throughout the entire tank reproduces the volume of liquid in it.

One of the main drawbacks of this type of configuration for measuring fuel is the fact of having to introduce an electric current inside a fuel tank containing inflammable fuel, even though these currents are of low intensity and low voltage, along with the increase in the complexity of assembling the installation. For this reason it is necessary to protect the electric cables to which the gauges are attached, and also to earth the bundles of electric cables which need to be included inside the tank due to the introduction inside of a considerable number of gauges, since they are installed in pairs in order to provide redundancy.

Moreover, it can be pointed out that it is known in the state of the art that the fuel contained in a tank can be measured by means of optic fibre cables running along the inside of the tank, these cables being connected to some measuring equipment for the volume of fuel which uses a light transmitter which injects light from one of the ends of the optic fibre, so that in the other end the beam of light impinges on the liquid contained in the tank. The signal which is going to be reflected has a wavelength that depends on the medium the light is propagating in, in other words, if the end of the fibre emitting the light is covered with fuel (fibre wetted by liquid) the propagation in this medium gives rise to a transmitted wave having certain characteristics, while if the light is propagated through air (dry fibre), then a different signal from the previous one is obtained in a light receptor which is connected to a signal processor, which obtains the measurement of the volume of liquid contained in the tank.

The use of optic fibre with the corresponding measuring equipment has not been applied for measuring the volume of fuel in the tanks of aircraft.

DESCRIPTION OF THE INVENTION

In order to achieve the objectives and overcome the drawbacks stated above, the invention has developed a new liquid fuel tank intended for permitting the measurement of the volume of fuel contained in said fuel tank, and which as with those provided in the state of the art is connected to some equipment for measuring the volume of fuel, based on the refraction of light in the different mediums (air, fuel) by means of the transmission/reception of light via the optic fibre, as was described above. The main novelty of the invention lies in the fact that it is characterized in that at least one of the inner lateral faces of the tank comprises at least one sheet whose rear face includes an array of optic fibre cables of different lengths that are located between the inner lateral face of the tank and the sheet in such a way that this configuration provides complete protection for the optic fibre cables. Moreover, the lengths of the optic fibre cables are such that they lie between a size corresponding to a minimum level of fuel up to a size corresponding to a maximum level of fuel, all this in such a way that one set of the ends of the optic fibre cable, either the upper ends or the lower ends depending on how the cables are arranged, are laid out in such a way that they make contact with the fuel when it reaches their level and can measure the level of fuel at any moment by means of some fuel measuring equipment which carries out the transmission/reception of light as was described in the section on the background of the invention.

In one embodiment of the invention, the lengths of the optic fibre cables increase from a minimum size corresponding to a minimum level of fuel up to a maximum size corresponding to the maximum level of fuel. In this case, the sheet is located from the lower part of the inner face of the tank, in other words, the fibres arranged in the sheet run with a growing length from the lower part of the inner lateral face of the tank up to its upper part, for which the upper side of the sheet is ascending from the minimum level up to the maximum level of fuel.

In another embodiment of the invention, unlike in the previous case, the lengths of the optic fibre cables increase from a minimum size corresponding to a maximum level of fuel up to a maximum size corresponding to a minimum level of fuel. In this case, the sheet is located from the upper part of the inner face of the tank, in other words, the cables run from the upper part of the inner lateral face of the tank descending towards its lower side, for which in this case the lower side of the sheet is descending from the maximum level down to the minimum level of fuel.

In a preferred embodiment of the invention, the cables are arranged parallel and equidistant in the vertical direction.

The preferred embodiment also provides that two of the opposing inner lateral faces of the tank are fitted with a sheet whose optic fibre cables cross over each other and are arranged in opposite directions in such a way that those of one of said inner lateral faces run from its upper side to the lower one as was described, and those of the opposite face run from the lower side to the upper, such that virtually the entire volume of the tank is covered in order to make the measurements of fuel at any moment.

Regarding the ends of the optic fibre cables making which are in contact with the fuel, these are defined by the circular cross-section of said cable, in other words the cross-section of the cable is the only part that is in contact with the fuel. Another option that could also occur is that the part of the cable in contact with the fuel is a short length of cable, though this case is less recommendable since drops of fuel could form on the tip of the fibres owing to the phenomenon of "surface tension" of the liquid, which could lead to erroneous readings being produced.

Both the sheet and the optic fibre cables define a triangular configuration that is fixed on the inner lateral face or faces of the tank, in accordance with the description made.

In the preferred embodiment of the invention, the lateral ends of the sheet are arranged in correspondence with the lateral ends of the inner lateral face of the tank, in other words, it occupies the dimension of the tank in the horizontal direction.

According to the description made, the invention is applied to any kind of tank, but more particularly it is applied to those tanks that are made of carbon fibre, as in the case of the tanks of the horizontal stabilizer included in aircraft. In this case, the sheet is made of fibreglass such that the sheet, along with the adhered optic fibre cables, are fixed on the inner lateral face of the tank by means of a gluing process via the curing of the fresh fibreglass sheet on the carbon fibre that has previously been cured, in other words, once the carbon fibre has been cured, the fresh fibreglass is then placed on it with the optic fibre cables glued, and a second curing is carried out.

The invention also provides that the sheet with the adhered optic fibre cables can be fixed to the inner lateral face of the tank by means of a process in which the carbon fibre is in the fresh state as well as the fibreglass, which is located on the carbon fibre with the optic fibre cables, and the entire assembly is cured in one go, with all the elements remaining joined together.

Finally, it can be pointed out that with regard to the ends of the optic fibre cable, the opposite ends of the cable of the ends provided for being submerged in the fuel, converge and are joined to a connector for connection to the measuring equipment. Nevertheless, the possibility also exists that said ends of the optic fibre cable opposite to the ends provided for being submerged in the fuel emerge from the sheet and are connected to connectors for respective optic fibre cables which form a band, and end in a connector for connection to the measuring equipment.

Below, in order to facilitate a better understanding of this descriptive specification and forming an integral part thereof, a series of figures is attached in which the object of the invention has been represented by way of illustration and non-limiting.

BRIEF DESCRIPTION OF THE FIGURES

FIGS. 4 and 5.—Show an elevation view of opposing inner lateral faces of the tank in which are included the optical fibres crossing over and inverted, and from the opposite sides of the opposing faces.

FIG. 6.—Shows a schematic view of the whole fibreglass sheet in which are adhered the optic fibres that are arranged on the inside of the opposing lateral face of the tank in order to obtain the configuration shown in the previous figures.

FIG. 7.—Shows a view according to cross-section A-A of the previous figure.

DESCRIPTION OF THE PREFERRED FORM OF EMBODIMENT

Given below is a description of the invention based on the figures commented on above.

Figure 1:
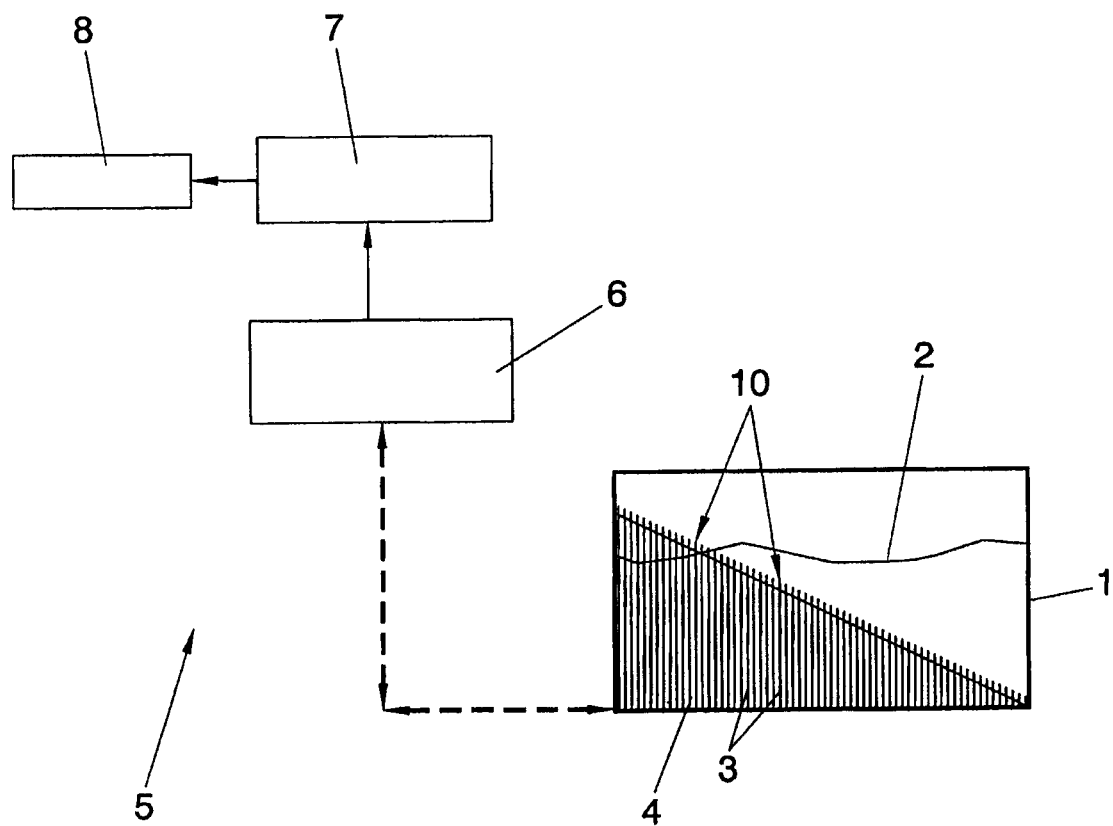
FIG. 1.—Shows a schematic representation of the invention.
Figure 2:
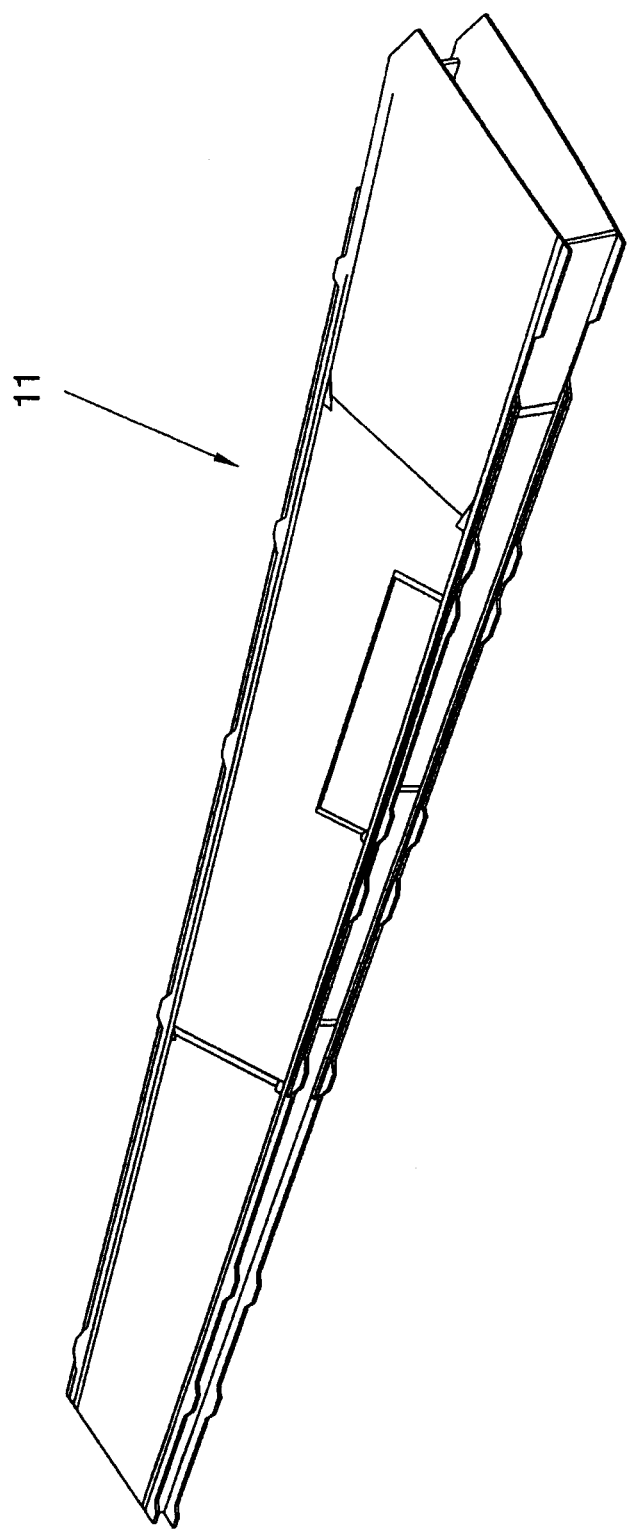
FIG. 2.—Shows a perspective view of a torsion box of a horizontal stabilizer of an aircraft inside which is housed a tank in accordance with the invention.
Figure 3:
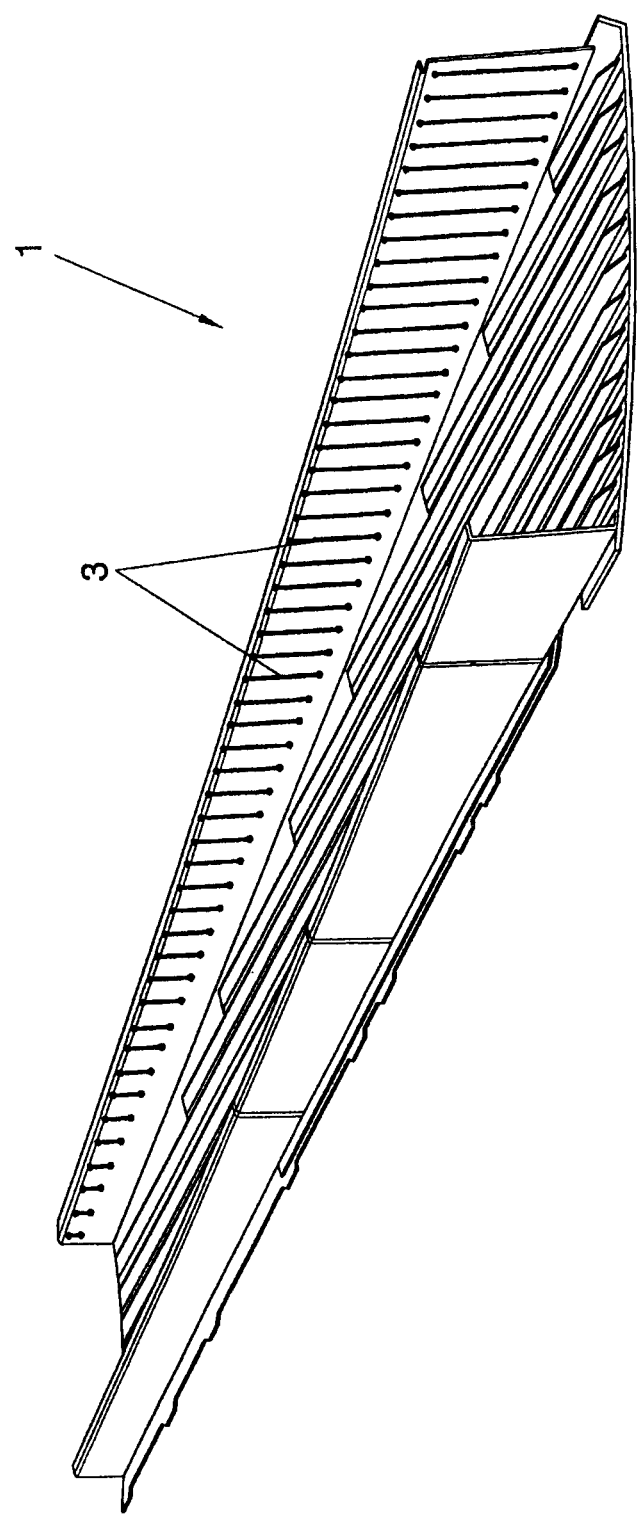
FIG. 3.—Shows a schematic perspective view of the interior of the tank of the horizontal stabilizer of the previous figure in which part of the faces have been removed in order to show the arrangement of the optic fibre along one of the lateral faces of the tank.
Figure 8:
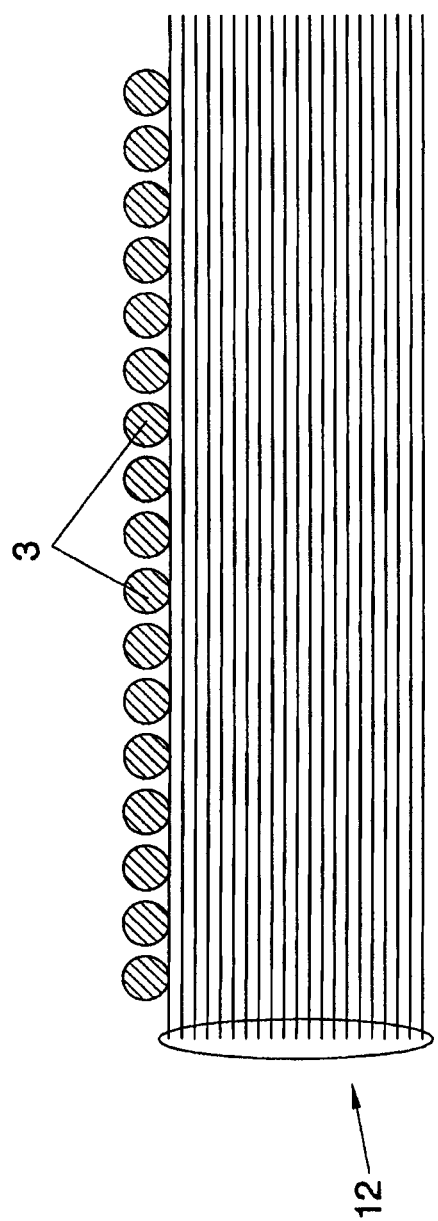
FIG. 8.—Shows a view according to cross-section B-B of FIG. 6.

The invention consists of a liquid fuel tank 1 intended for carrying out the measurement of said volume of fuel 2, for which, as shown in FIG. 1, an array of optic fibre cables 3 of different lengths is provided, which are adhered to the inside of a sheet 4 for being fitted to the inner face of one of the lateral walls of the tank 1, in such a way that the optic fibre is embedded between the inner face of the lateral wall of the tank 1 and the sheet 4.

This arrangement permits the connection to be made, as will be explained further below, of each of the optic fibres 3 with some measuring equipment 5 which comprises a light transmitter/receiver 6, in such a way that the light transmitter emits with a certain band of wavelengths such that, for a liquid that has high light absorption properties, the power supplied by the transmitter will be sufficient. Said light transmitter injects the light from one of the ends 9 of each of the optic fibre cables 3, so that in the other end 10 the beam of light impinges on the fuel 2 or on the air in the tank, depending on whether the end 10 of the optic fibre cable is submerged in the fuel 2 or not. Therefore, the light signal that is reflected has a wavelength that depends on the medium in which it propagates, this signal being picked up by means of the light receiver, which sends the signals to a signal processor 7, which, on the basis of all the signals sent to the receiver by each of the optic fibres 3, determines the volume of fuel 2 contained in the tank 1. The measuring equipment 5 is known and is therefore not the object of the invention, so it has been described only briefly in order to facilitate an understanding of the invention.

Figure 9:
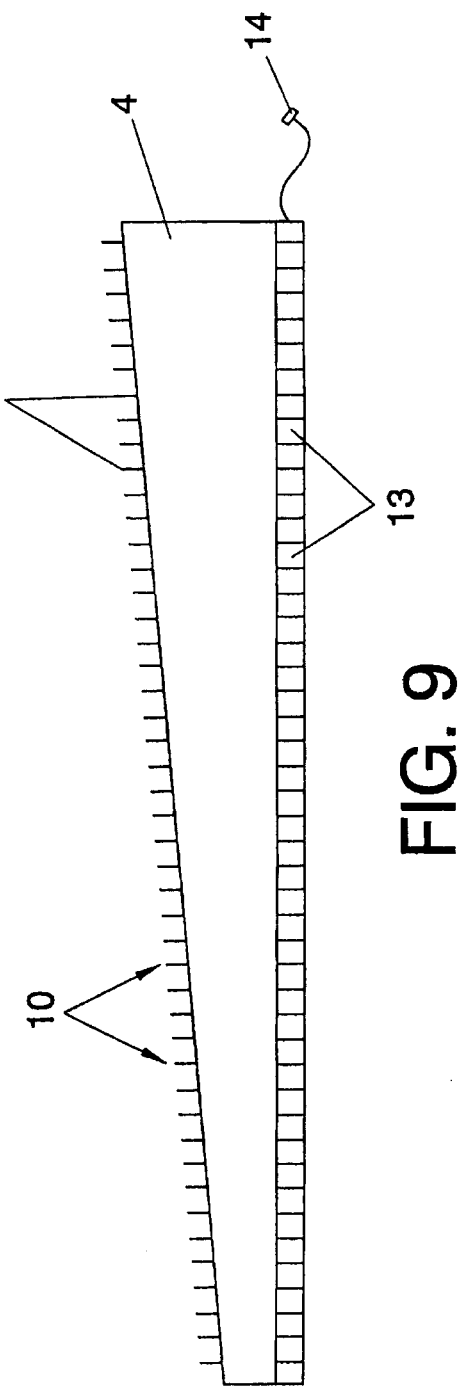
FIG. 9.—Shows a schematic view of the connection of the lower ends of the optic fibre to a connector for connection to the measuring equipment.

In the example of embodiment the cables are arranged on the sheet 4 both forming a triangular configuration in such a way that their size grows from one end of the sheet to the opposite end. In order to allow the light to be emitted, as was described, the ends 10 of the optic fibre cables 3 have to be in contact with the liquid or air depending on the level of fuel 2 in the tank 1, for which a short length of cable is left exposed, which projects with respect to the sheet 4 as for example is shown in FIGS. 6 and 9. This arrangement, however, can produce the formation of drops of fuel at the tip of the fibres, owing to the phenomenon of "surface tension" of the liquid, which could produce erroneous readings. In order to avoid this possible drawback, just the cross-section of the cable is left exposed to the air, for which the fibres are cut at the same level as the sheet, in other words "flush" with it. Obviously, the cable can also project from the sheet 4 but with the entire length that is projecting being protected with the exception of the actual cross-section of the cable, as was described above. In this way, moreover, protection is assured of the optic fibre towards possible external harmful agents.

The invention uses two sheets 4 with the corresponding optic fibre cables 3 which are arranged on two of the inner faces of the opposing lateral walls of the tank 1, in such a way that one of the sheets 4 is located so that the ends 9 via which the light is injected are located in the upper part of one inner lateral face, with the ends 10 being directed towards the lower side of that inner face, in such a way that the lengths of the optic fibre cables increase from a minimum size corresponding to a maximum level of fuel, to a maximum size corresponding to a minimum level of fuel, in other words the minimum size of cable corresponds to the maximum level of fuel and the maximum size corresponds to the minimum level of fuel.

As far as the distribution and number of fibres installed in each of the structural parts is concerned, it can be said that around a hundred fibres are installed, with a separation between them of about 80-100 mm, so that a precision of approximately 10 mm is achieved in the variation of the volume of liquid in the tank.

On the other hand, provided in the opposing lateral face are cables running in the opposite direction, in other words, with their ends 9 located close to the lower side and the end 10 directed towards the upper side, in such a way that they present an increasing length from a minimum size corresponding to a minimum level of fuel up to a maximum size corresponding to a maximum level of fuel.

The cables 3 of greater length on each inner lateral face of the tank are located on opposite sides, as are those of shorter length, as can be seen in FIGS. 4 and 5.

The optic fibre cables 3 of one inner lateral face and those of the opposing face cross over each other, in such a way that this arrangement allows an instantaneous reading of the amount of fuel contained in the tank to be made, no matter what level it might be at.

In order to achieve the described configuration, the invention provides a template in which the sheet 4 is obtained together with the optic fibre cables 3 in such a way that this array can later on be integrated into the tank 1 in accordance with the described configuration.

For the case that we are concerned with, given that the tank 1 is made of carbon fibre 12, provision is made for the sheet 4 to be of fibreglass in such a way that the optic fibre cables (3) adhere to it, the array being able to be included in the inner lateral faces of the lateral walls of the tank 1 by means of a co-curing process in which the carbon fibre 12 and the fibreglass 4 are fresh and uncured, so that the fibreglass sheet 4 is located on the carbon fibre 12 with the whole array being subjected to a curing process in which the attachment of the fibreglass is made on the carbon fibre. The attachment is therefore carried out in a single curing cycle.

The said attachment could also be effected in a process of co-gluing, in which the carbon fibre 12 is cured in a first curing cycle, and then the template with the fresh fibreglass is added, and after that the entire array is subjected to a second cycle of curing after which the final cured piece is obtained, in which the carbon fibre contains the optic fibre cables 3.

Moreover, in order to effect the connection of the optic fibre cables 3 with the measuring equipment 5, provision is made for the ends 9 of the optic fibre cables 3 to be likewise projecting with respect to the sheet 4, so that all the optic fibres can be easily connected to some connectors 13 of a band which converges in a single connector 14 for connection to the measuring equipment 5.

The described configuration permits the easy integration of the optic fibre cables 3 in the interior of the tank 1 and their easy connection to the measuring equipment 5.

The invention claimed is:

1. A liquid fuel tank for measuring fuel volume, connected to measuring equipment to measure the fuel volume based on refraction of light on different mediums by means of transmission/reception of light via optic fibres, the liquid fuel tank comprising:
    inner lateral faces of the tank,
    wherein at least one face of the inner lateral faces of the tank has at least one sheet whose rear face includes an array of optic fibre cables of different lengths, the optic fibre cables being located between the at least one face of the inner lateral faces of the tank and the at least one sheet in such a way to provide complete protection for the optic fibre cables,
    wherein lengths of the optic fibre cables are sized between a size corresponding to a minimum level of fuel up to a size corresponding to a maximum level of fuel,
    wherein one end of the optic fibre cables, selected between an upper and a lower end, are arranged so that they make contact with the fuel when the fuel reaches their level, the fibres of the optic fibre cables being cut at the same level as the sheet for measuring a level of fuel at any moment, and
    wherein an opposite end of the optic fiber cables are connected to the measuring equipment.

2. The liquid fuel tank for measuring fuel volume, in accordance with claim 1,
    wherein the lengths of the optic fibre cables increase from a minimum size corresponding to the minimum level of fuel up to a maximum size corresponding to the maximum level of fuel, and
    wherein a height of the at least one sheet beginning from a lower part of the at least one face of the inner lateral faces of the tank to an upper side of the at least one sheet ascends from the minimum level of fuel to the maximum level of fuel.

3. The liquid fuel tank for measuring fuel volume, in accordance with claim 1,
    wherein the lengths of the optic fibre cables increase from a minimum size corresponding to the maximum level of fuel up to a maximum size corresponding to the minimum level of fuel, and
    wherein a height of the at least one sheet beginning from an upper part of the at least one face of the inner lateral faces of the tank to a lower side of the at least one sheet descends from the maximum level of fuel to the minimum level of fuel.

4. The liquid fuel tank for measuring fuel volume, in accordance with claim 2 or 3, wherein the optic fibre cables are arranged parallel and equidistant in a vertical direction.

5. The liquid fuel tank for measuring fuel volume, in accordance with claim 1, wherein two opposing faces of the inner lateral faces of the tank comprise a sheet whose optic fibre cables are placed in opposite position with respect to the other opposing face.

6. The liquid fuel tank for measuring fuel volume, in accordance with claim 1, wherein the one end of the optic fibre cables making contact with the fuel are defined by a segment selected between a short length of cable and a circular cross-section of that cable.

7. The liquid fuel tank for measuring fuel volume, in accordance with claim 1, wherein the optic fibre cables define a triangular configuration.

8. The liquid fuel tank for measuring fuel volume, in accordance with claim 1, wherein the at least one sheet presents a surface whose lateral ends are arranged in correspondence with lateral ends of the at least one face of the inner lateral faces of the tank.

9. The liquid fuel tank for measuring fuel volume, in accordance with claim 1, wherein the tank is made of carbon fibre.

10. The liquid fuel tank for measuring fuel volume, in accordance with claim 1, wherein the at least one sheet is made of fibreglass.

11. The liquid fuel tank for measuring fuel volume, in accordance with claim 1, wherein the at least one sheet has the optic fibre cables adhered thereon and is fixed on the at least one face of the inner lateral face of the tank by means of a process selected between a gluing process of curing the at least one sheet made of a fresh fibreglass sheet on the tank made of carbon fibre that has previously been cured, and a curing process of the at least one sheet made of a fresh fibreglass sheet together with the tank made of fresh carbon fibre.

12. The liquid fuel tank for measuring fuel volume, in accordance with claim 1, wherein the liquid fuel tank is applied to an aircraft.

13. The liquid fuel tank for measuring fuel volume, in accordance with claim 12, wherein the liquid fuel tank is applied to a horizontal stabilizer.

14. The liquid fuel tank for measuring fuel volume, in accordance with claim 1, wherein the opposite end of the optic fibre cables, opposite to the one end provided to be submerged in the fuel, converges and are joined in a single connector to connect to the measuring equipment.

15. The liquid fuel tank for measuring fuel volume, in accordance with claim 1, wherein the opposite end of the optic fibre cables, opposite to the one end provided to be submerged in the fuel, projects from the at least one sheet and are connected to connectors of respective optic fibre cables which form a band, said band ends in a single connector to connect to the measuring equipment.

* * * * *